United States Patent [19]

Bogard et al.

[11] 3,772,161

[45] Nov. 13, 1973

[54] METHOD OF SELECTIVELY ELECTROPLATING THERMOPLASTIC SUBSTRATES USING A STRIPPABLE COATING MASK

[75] Inventors: Adrian E. Bogard, Marietta, Ohio; Robert E. DeValeria, Parkersburg, W. Va.

[73] Assignee: Borg-Warner Corporation, Chicago, Ill.

[22] Filed: Jan. 3, 1972

[21] Appl. No.: 215,093

[52] U.S. Cl. .................. 204/15, 117/6, 117/161 UD

[51] Int. Cl. ....... C23b 5/48, B44d 1/09, C09d 3/48

[58] Field of Search ......................... 117/161 UD, 6; 204/15, 20, 30

[56] References Cited

UNITED STATES PATENTS

| | | | |
|---|---|---|---|
| 2,872,391 | 2/1959 | Hauser et al. | 204/15 |
| 3,037,882 | 6/1962 | Cahn | 117/161 UD |
| 3,445,350 | 5/1969 | Klinger | 204/30 |

*Primary Examiner*—T. Tufariello
*Attorney*—Thomas B. Hunter

[57] ABSTRACT

A strippable masking or resist coating for preventing metal deposition on a thermoplastic surface is in the form of vinyltoluene-butadiene copolymer applied to the surface. The copolymer is readily removable by means of a solvent which does not dissolve or otherwise affect the thermoplastic substrate.

4 Claims, No Drawings

METHOD OF SELECTIVELY ELECTROPLATING THERMOPLASTIC SUBSTRATES USING A STRIPPABLE COATING MASK

BACKGROUND AND SUMMARY OF THE INVENTION

1. Field of the Invention

The selective plating of thermoplastic substrates, particularly acrylonitrile-butadiene-styrene (ABS) graft polymers, by the use of a masking coat which prevents metal deposition and is readily removable by a solvent.

2. Description of Prior Art

Several commercially available masking compositions have been used in the past as resist coatings for plating on thermoplastic substrates. All of these have disadvantages such as, for example, inability to be easily removed by a solvent which will not attack the thermoplastic surface. Another problem is the lack of adhesion to the surface and poor resistance to the plating cycle. Such examples of known masking agents are polyurethane, acrylate-styrene copolymers and styrene-butadiene copolymers, all dissolved in suitable solvents.

DETAILED DESCRIPTION OF THE INVENTION

In the present invention, a coating solution comprising a resin soluble in a solvent which has no detrimental effect on the substrate properties is applied to the surface of the substrate prior to plating the surface with a metal. Almost any commercially available plating cycle may be used; however, in a preferred embodiment, the steps include etching the surface with a chromic-sulfuric acid solution, neutralizing the surface to prevent carryover of chromium + 3 ions, catalyzing the surface with, for example, a noble metal catalyst, depositing a nickel layer by electroless deposition in a nickel-hypophosphite bath, or a copper layer in a copper-formaldehyde bath, electroplating the surface with suitable layers of nickel, chromium and copper, and then removing the masking coat in a suitable solvent.

The strippable coating which has been found to be most useful for carrying out the invention is a vinyltoluene-butadiene copolymer having about 80–95 parts vinyltoluene and about 5–20 parts butadiene. This coating is readily soluble in aliphatic solvents that are characterized by either a minimum Kauri-butanol value of 38 or a maximum aniline point of 140° F. which do not gel, glaze or otherwise mar the appearance of the thermoplastic substrate. Also, in terms of the invention, the most useful substrate to be employed is that of an ABS graft polymer.

Solvents that may be used in this invention as long as they conform to either the Kauri-butanol criterion (minimum 38) or the aniline point criterion (maximum 140° F.) include heptane, stoddard solvent, mineral spirits, VM and P naptha, lactol spirits, rubber solvent, textile spirits, cyclohexane, and mixtures thereof. The test procedures to determine these values are covered by ASTM D611-64 or ASTM 1012-62 (both aniline point) and ASTM D113-61 (Kauri-butanol value). The aniline point is defined as the minimum equilibrium solution temperature for equal volumes of aniline and solvent. The Kauri-butanol value of a solvent is defined as the volume in milliliters at 25° C of the solvent, corrected to a defined standard, required to produce a defined degree of turbidity when added to 20 g of a standard solution of kauri resin in normal butyl alcohol. For Kauri-butanol values of 60 and over, the standard is toluene and has an assigned value of 105. For Kauri-butanol values under 60, the standard is a blend of 75 percent n-heptane and 25 percent toluene and has an assigned value of 40.

With respect to the electroless and electrolytic deposition, reference herein is made to U.S. Pat No. 3,445,350 "Metal Plating of Plastic Materials," Klinger et al., issued May 20, 1969. This patent contains a detailed description of a suitable electroless plating cycle and an electrolytic plating cycle, both of which may be used in the present system. The entire Klinger et al patent is intended to be incorporated by reference herein.

In order to understand the best mode contemplated for carrying out the invention, reference should be made to the following example:

A test plaque of ABS graft polymer (CYCOLAC EP-3510 — Marbon Chemical Division, Borg-Warner Corporation) was selectively treated by applying a 30.0 weight percent solids solution of a vinyltoluene-butadiene copolymer containing 91 parts vinyltoluene and 9 parts butadiene in an aliphatic mineral spirits/-heptane (50/50) solvent having an aniline point of 130° F. and a Kauri-butanol value of 38, to selected portions of the plaque. The polymer, which may be applied by dip, brush or spray, firmly adheres to the surface of the substrate. The plaque was processed through a conventional electroless and electrolytic plating cycles using a sulfuric acid-chromic acid etch, a palladium catalyst, and a room temperature nickel-hypophosphite electroless bath. The portion which was coated with the vinyltoluene-butadiene copolymer showed no metal deposition whatever. The copolymer coating is then stripped from the surface by immersion in a solvent wash comprising 50/50 mineral spirits/heptane blend. The coating was readily removed without harmful effects to either the plated or the unplated portions of the surface.

While this invention has been described in connection with a certain specific embodiment thereof, it is to be understood that this is by way of illustration and not by way of limitation; and the scope of the appended claims should be construed as broadly as the prior art will permit.

We claim:

1. A method of selectively plating a thermoplastic substrate comprising the steps of masking the portion of the surface which is to remain unplated by coating said portion with a vinyltoluene-butadiene copolymer, etching said surface, applying an electroless metal layer, electrolytically applying a metal to the electroless metal layer and removing said copolymer by means of an aliphatic solvent which will dissolve said copolymer but will not adversely effect said thermoplastic substrate.

2. A method as defined in claim 1 wherein said solvent has a minimum Kauri-butanol value of 38.

3. A method as defined in claim 1 wherein said solvent has a maximum aniline point of 140° F.

4. A method as defined in claim 1 wherein said thermoplastic substrate is an acrylonitrile-butadiene-styrene graft polymer.

* * * * *